United States Patent [19]

Lee

[11] Patent Number: 5,371,869
[45] Date of Patent: Dec. 6, 1994

[54] MICRO-CONTROLLER UNIT FOR SELECTIVELY ACCESSING AN INTERNAL MEMORY OR AN EXTERNAL EXTENDED MEMORY USING A READ/WRITE TERMINAL

[75] Inventor: Byeongjun Lee, Seoul, Rep. of Korea

[73] Assignee: Samsung Electronics Co., Ltd., Rep. of Korea

[21] Appl. No.: 816,822

[22] Filed: Jan. 3, 1992

[30] Foreign Application Priority Data

Apr. 3, 1991 [KR] Rep. of Korea .................. 91-5387

[51] Int. Cl.$^5$ .................. G06F 13/00; G06F 12/00; G06F 1/04
[52] U.S. Cl. .................. 395/425; 395/550; 395/700; 364/DIG. 1; 365/189.03
[58] Field of Search ............ 395/425, 400, 550, 700, 395/725; 364/DIG. 1; 365/189.03, 233, 230.08, 230.03

[56] References Cited

U.S. PATENT DOCUMENTS

| | | | |
|---|---|---|---|
| 4,432,049 | 2/1984 | Shaw et al. | 395/800 |
| 4,542,453 | 9/1985 | Patrick et al. | 395/275 |
| 4,677,586 | 6/1987 | Magar et al. | 395/575 |
| 4,870,562 | 9/1989 | Kimoto et al. | 395/550 |
| 4,870,563 | 9/1989 | Oguchi | 395/375 |
| 5,046,180 | 9/1991 | Ueda et al. | 365/189.03 |

Primary Examiner—Glenn Gossage
Attorney, Agent, or Firm—Clifford A. Poff

[57] ABSTRACT

A micro-controller unit (MCU) selectively accesses one of an external extended memory and an internal memory in response to a signal on a read/write terminal instead of an additional terminal. The micro-controller unit includes an external memory control block, an external timing control block, and the internal memory, and additionally includes a reset detection circuit, a memory access clock generation circuit and a latch. The reset detection circuit receives an external reset signal for initializing the MCU and an external clock, and detects whether the micro-controller unit is reset. The memory access clock generation circuit receives an output signal from the reset detection circuit and generates a memory access clock signal to selectively access one of the internal memory and the external extended memory. The latch receives the external reset signal, the memory access clock signal and a memory interface signal applied to the read/write terminal for applying a memory access selection signal to the external memory control block, the external timing control block and the internal memory, whereby a memory selection is performed by the reset signal and the memory interface signal.

5 Claims, 3 Drawing Sheets

FIG.3A
FIG.3B
FIG.3C
FIG.3D
FIG.3E
FIG.3F
FIG.3G
FIG.3H
FIG.3I
FIG.3J if R/$\overline{W}$="H", $\overline{EA}$="H"
if R/$\overline{W}$="L", $\overline{EA}$="L"

MICRO-CONTROLLER UNIT FOR SELECTIVELY ACCESSING AN INTERNAL MEMORY OR AN EXTERNAL EXTENDED MEMORY USING A READ/WRITE TERMINAL

BACKGROUND OF THE INVENTION

1. Field of the Invention

The present invention relates to a micro-controller, and more particularly to an improved micro-controller to simplify the hardware necessary for accessing an extended memory.

2. Description of the Prior Art

In order to adopt a micro-controller unit (MCU), for example, for use in a controller for a cassette or a floppy disk memory device, logic is embodied by the existence of wiring which increases the need for hardware according to the type of controller. When the controller includes an integrated processor that can program a micro program, a control according to the use may be made simply by changing the micro program and in this circumstance, a micro-controller is needed.

Furthermore, when a read only memory (ROM) used to store a predetermined amount of the micro program is constructed on the semi-conductor chip of the micro controller unit, an exclusive pin controller for the chip can be created, and it is economical for this purpose, to choose a presently available one-chip micro-controller unit having a internal ROM. In this way, a standard application is available by using the above identified floppy disk device and the one-chip micro-controller unit incorporating a micro program.

When the micro-controller unit includes an internal ROM with a given capacity, there exists hardware that can access an extended memory so as to accommodate the possibility of external extended memory. Generally, since the one-chip micro-controller unit has an extra external terminal pin, a control signal, namely, a high or low level signal, can be applied to this pin so as to select, access and control an internal ROM or an external extended memory.

SUMMARY OF THE INVENTION

Accordingly, it is an object of the present invention to provide micro-controller units to access selectively an internal memory or an external extended memory through a read/write terminal of the micro-controller unit instead of an additional terminal for access to an external extended memory.

According to the present invention, there is eliminated the need for an additional mode selection terminal to selectively access the internal memory or an external extended memory, and further that mode selection can be achieved by a signal applied to a terminal already being used for other purposes.

More particularly there is provided in a microcontroller unit for selectively accessing an external extended memory and including an external memory control block, an external timing control block, and an internal memory, an improvement comprising a reset detection circuit receiving an external reset signal for initializing the micro-controller unit and an external clock, and for detecting whether the microcontroller unit is reset, a memory access clock generation circuit receiving an output signal from the reset detection circuit and generating a memory access clock signal to selectively access one of the internal memory and an external extended memory, and a latch receiving the memory access clock signal, the external reset signal and a memory interface signal and applying a memory access selection signal to the external memory control block, the external timing control block and the internal memory, whereby a memory selection is performed by the reset signal and the memory interface signal.

BRIEF DESCRIPTION OF THE DRAWING

These features and advantages of the present invention as well as others will be more fully understood when the following description is read in light of the accompanying drawings in which:

FIGS. 3A—3J are timing wave forms to illustrate the operation of the circuit shown in FIG. 2.

DESCRIPTION OF THE PREFERRED EMBODIMENT

Figure 1:
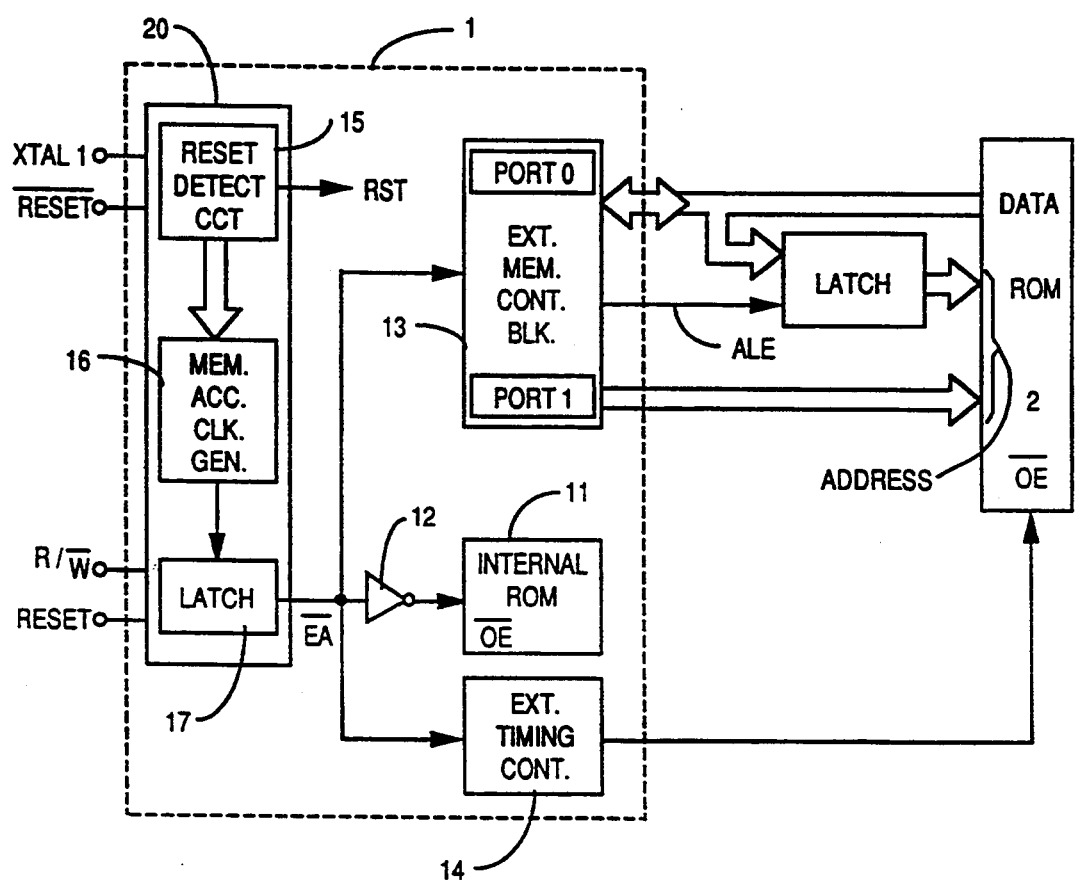
FIG. 1 is a block diagram showing a micro-controller unit connected with an external ROM according to the present invention.

Referring to FIG. 1, there is shown a block diagram of micro-controller unit 1 including a circuit of the present invention and an external read only memory (ROM) 2 connected to micro-controller unit (MCU) 1. The circuit in FIG. 1 identified generally by reference numeral 20 embodies the features of the present invention and is illustrated in detail in FIG. 2.

The circuit 20 of the present invention provides an $\overline{EA}$ signal to other circuits (not shown) of the microcontroller unit which are conventional circuits and well known in the art.

The basic system of the micro-controller unit 1 is identical with an 8 bit MCU, integrated circuit (IC) chip serial No. 8051 made by Intel Corp. Ltd. (Santa Clara, Calif.).

However, unlike the prior art, the MCU 1 includes, means for generating a memory access selection signal $\overline{E}$ so as to select an internal or external ROM without using or requiring an additional pin for outputting the $\overline{EA}$ signal.

As seen from FIG. 1, the circuit 20 generates an $\overline{EA}$ signal inside the MCU. Circuit 20 includes a reset detection circuit 15 for receiving a clock signal XTAL1 and a reset signal $\overline{RESET}$. Circuit 15 operates to detect whether the MCU is reset or not. A memory access clock generating circuit 16 receives an output signal from the reset detection circuit 15 and generates a clock signal to selectively access an internal memory or external extended memory. A latch 17 receives the clock signal from circuit 16 and, also receives a memory interface signal, namely a read/write (R/W) signal for generating an $\overline{E}$ signal.

The MCU has an internal ROM 11 as shown in FIG. 1. A capacity of this internal ROM is 4k bytes and at the time of using the external extended ROM 2, a usable capacity can be extended up to 64k bytes.

However, when an extended ROM is further included, an internal ROM access address and an external ROM access address are designated at the same time. Therefore, an additional control signal terminal, is required to access to selectively one address of the two addresses. This additional control signal terminal is a memory access selection control terminal $\overline{EA}$. When the signal $\overline{EA}$ is set to be '1' the internal ROM is selected, and when the signal $\overline{EA}$ is set to be '0', the external ROM is selected.

The following explanation of a specific example applies to the aspect of the present invention when the $\overline{EA}$ signal becomes '1'. In a case where the $\overline{EA}$ signal is set to '1', an internal ROM 11 in the micro-controller unit is accessed. In this circumstance, a '0' of low level signal is supplied to an output enable terminal of the ROM 11 through an invertor 12. Therefore, the internal ROM attains a state of being accessible.

At the same time, the $\overline{EA}$ signal is supplied as a control signal to an external memory control block 13 and an external timing control block 14.

In the event the external memory control block 13 includes a port PORT 0, this port is as an address/data port using a multiplexer, and port PORT 1 is used as an ADDRESS port.

The circuit of the external memory control block 13 is not illustrated in detail. The external memory control block receives the $\overline{EA}$ signal at a high level, "1" and generates a signal that disables the external ROM 2 so that the external ROM cannot be accessed.

In addition, the $\overline{EA}$ signal is also applied to the external timing control block 14 within the MCU this block 14 controls a timing of a bus cycle within the MCU and generates an address strobe or a data strobe signal necessary for the memory interface after determining whether a state of the present memory access is an internal or external one.

In summary, when the $\overline{EA}$ signal is set to be '1', in this embodiment, the internal ROM is accessed for a memory size of 4k bytes, and the mode of the external timing control block 14 is changed to access the external ROM for a memory more than 4k bytes. When the $\overline{EA}$ signal is set to be '0', the internal ROM 11, as seen from FIG. 1, attains a state of disabled. At the same time, the $\overline{EA}$ signal of the low level is supplied to the external memory control block 13 and the external timing control block 14. When the external timing control circuit block 14 receives the $\overline{EA}$ signal of the low level, the external ROM 2 is activated. The external memory control block 13 accesses the external memory through the port PORT 0, thus making the external ROM usable.

Figure 2:
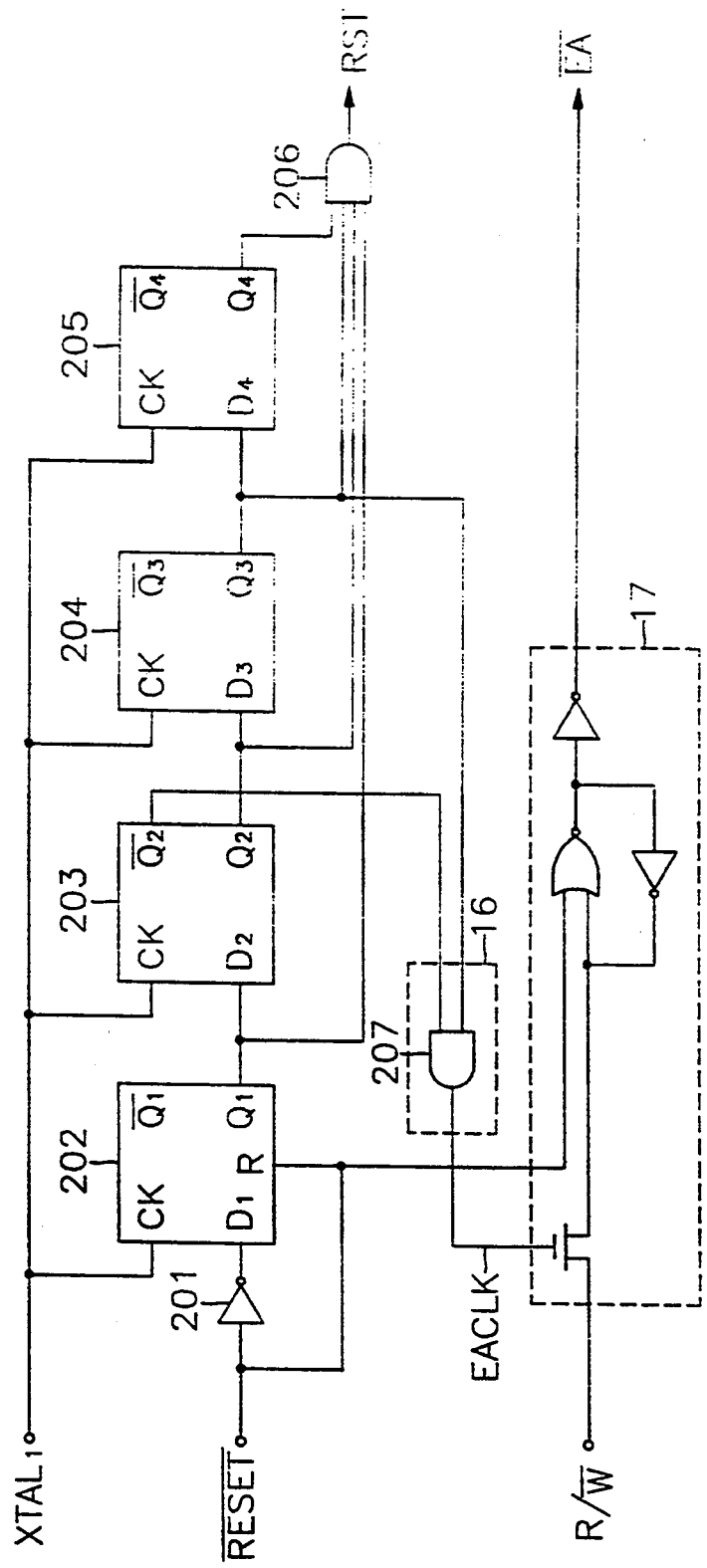
FIG. 2 illustrates one embodiment of a circuit diagram of one circuit for a micro-controller unit of the present invention.

It is important that a signal by a selective level transition of the $\overline{EA}$ signal is supplied to the various circuits responsive to the $\overline{EA}$ signal levels as discussed above. While an embodiment of the circuit 20 of the present invention identified in the block diagram of FIG. 1, is shown in FIG. 2, is to be understood that the present invention is not limited to the embodiment shown in FIG. 2. Furthermore, as will be explained hereinafter, the present invention is not limit to the use of a specific signal applied from outside of the MCU.

Now, an embodiment of the present invention will be explained through the circuit for FIG. 2 and the timing waveforms of FIGS. 3A–3J.

The main clock XTAL1 received from outside the MCU, is supplied to each clock terminal of four D-type flip-flops 202, 203, 204 and 205 forming part of the reset detection logic circuit 15. The waveform of the clock signal XTAL1 is illustrated in FIG. 3A. When a level change occurs in the $\overline{RESET}$ signal, namely, a transition from high level to low level is made as seen from the wave form of FIG. 3B, the first D-type flip-flop 202 is supplied with '1' as an input value by an invertor 201. Accordingly, as seen from the wave forms of Figs. 3C to 3F, the outputs $Q_1$ to $Q_4$ of the D-type flip-flops occur in cascading fashion because an output terminal D of an upstream stage (202 e.g.) is connected to an input terminal D of a next downstream stage (203 e.g.) in synchronism with the clock XTAL1. The reset signal used here is the signal for initializing the MCU itself, i.e., a signal from low level to high level.

In the event that the reset signal is applied under control by a user, for resetting the MCU, namely, for initializing the MCU, then as seen from FIG. 3A, a plurality of clock pulses must occur before the reset signal returns to the high level.

In the embodiment of the present invention shown in FIG. 2 and 3A–3J, if the reset signal remains low during five clock pulse periods of the external clock, the reset signal of a system attains a state of active.

As seen from the above circuit, during a time that the reset signal is at the low level and then becomes a high level again, each output signal of the D-type flip flops applied to an AND gate 206 is at the high level so that the system is reset by signal RST which is supplied to each circuit block of the MCU.

After the passage of a predetermined time, namely, after an initialization is completed, the reset signal attains a high level, as seen from the waveform of FIG. 3B.

At this time, the output of each flip-flop 202, 203, 204 and 205 attains an inverted value and sequentially attains a low level. The reset signal $\overline{RESET}$ is then made high and concurrently the system reset signal RST attains the low level.

On the other hand, when an output $Q_3$ from the third D-type flip-flop 204 and an inverted output $Q_2$ from the second D-type flip-flop 203 are high inputs to AND gate 207, the AND gate 207 outputs the high level signal according to the wave form of FIG. 3H.

After being reset, namely, initialized, the MCU will access the memory so as to fetch a command from the ROM.

At this time, to designate whether the memory to be accessed is the internal memory or the external memory, is determined by the state of the $R/\overline{W}$ signal among the memory interface signals, without having the additional $\overline{EA}$ terminal.

Further a part of the present invention, as seen from the wave form of FIG. 3I, a 'high' signal so as to make the $\overline{EA}$ signal high level, or 'low' signal so as to make the $\overline{EA}$ signal low level, is selected and sent to this $R/\overline{W}$ signal, and, after the MCU is reset, this selected signal applied to the latch. As thus applied to the latch, the signal provided thereby is usable (high level) for a memory access clock signal EACLK.

The above memory access clock signal EACLK is applied to a gate of a metal oxide semiconductor (MOS) transistor used for switching of the $R/\overline{W}$ signal, and therefore the MOS transistor attains a state of ON. The low or high level signal of the above $R/\overline{W}$ signal is applied to the latch 17, so that the $\overline{EA}$ signal is output as shown by the wave form of FIG. 3J.

However, since the $R/\overline{W}$ signal is the control signal having originally another purpose, and the signal transmission of the MOS transistor is intercepted because of the absence of memory access clock signal EACLK after an above operation, in any transition after the above operation, the latch 17 is not influenced by the $R/\overline{W}$ signal. Accordingly, the $\overline{EA}$ signal can be generated in an inside by using only the reset and the $R/\overline{W}$ signals, and the operation of the MCU is smoothly performed by the supply of the $\overline{EA}$ signal.

Accordingly, the $\overline{EA}$ signal can be generated inside the MCU by using only the reset and the R/$\overline{W}$ signals, and the operation of the MCU is smoothly performed by the internal supply of the $\overline{EA}$ signal.

It is possible to perform the memory access control by signals already having other purposes, namely, the reset signal and the R/$\overline{W}$ signal among the memory interface signals which can be in any of three different relations for the reset state of the MCU, without the need for an additional terminal to select the $\overline{EA}$ signal.

According to the present invention when using such a terminal having another purpose such as the R/$\overline{W}$ terminal, when an external ROM address having the same range as the internal ROM is designated, the addition of an exclusive terminal is not needed. Further, there is no need for using the additional MCU without a ROM.

While the present invention has been described in connection with the preferred embodiments of the various figures, it is to be understood that other similar embodiments may be used or modifications and additions made to the described embodiment for performing the same function of the present invention without deviating therefrom. Therefore, the present invention should not be limited to any single embodiment, but rather construed in breadth and scope in accordance with the recitation of the appended claims.

What is claimed is:

1. In a micro-controller unit for selectively accessing an external extended memory and including an external memory control block, an external timing control block, and an internal memory, an improvement comprising:

a reset detection circuit receiving an external reset signal for initializing said micro-controller unit and an external clock, and for detecting whether the micro-controller unit is reset;

a memory access clock generation circuit receiving an output signal from said reset detection circuit and generating a memory access clock signal to selectively access one of the internal memory and the external extended memory;

and a latch receiving said memory access clock signal, said external reset signal and a memory interface signal, for applying a memory access selection signal to said external memory control block, said external timing control block and said internal memory, whereby a memory selection is performed by said reset signal and said memory interface signal.

2. The improvement according to claim 1, wherein said reset memory interface signal comprises a read/write signal.

3. The improvement according to claim 1, wherein said reset detection circuit includes:

a plurality of D-type flip-flops, each supplied in common with an external clock signal, for generating sequentially delayed signals in response to a signal level-change of said external reset signal;

and an AND gate responsive to an output of each of said D-type flip-flops for generating a system reset signal.

4. The improvement according to claim 1, wherein said memory access clock generation circuit comprises an AND gate coupled to receive a plurality of sequentially delayed inputs from said reset detection circuit.

5. The improvement according to claim 1, wherein said latch includes a metal oxide semiconductor (MOS) transistor switched ON by a high level of said memory access clock signal and a gate latched by a read/write signal when said MOS transistor is ON.

* * * * *